United States Patent
Washnock et al.

[11] Patent Number: 5,557,821
[45] Date of Patent: Sep. 24, 1996

[54] CENTRIFUGAL PACKINGLINE MACHINE

[75] Inventors: John T. Washnock; Harold L. Thomas, both of Dunedin, Fla.

[73] Assignee: OMT Engineering Inc., Dunedin, Fla.

[21] Appl. No.: 410,985

[22] Filed: Mar. 27, 1995

[51] Int. Cl.$^6$ ............................................. A23N 12/00
[52] U.S. Cl. ............................ 15/3.13; 15/3.19; 15/3.21; 99/626
[58] Field of Search ........................ 15/3.12, 3.13, 15/3.16, 3.17, 3.18, 3.19, 3.20, 3.21, 21.1, 180; 99/536, 626, 516

[56] References Cited

U.S. PATENT DOCUMENTS

| | | | |
|---|---|---|---|
| 409,754 | 8/1889 | Phelps et al. | 15/3.16 |
| 745,658 | 12/1903 | Perry | 15/3.16 |
| 846,160 | 3/1907 | Strain | 15/3.19 |
| 1,319,541 | 10/1919 | Wang | 15/3.13 |
| 1,915,605 | 6/1933 | Griffith | 15/3.19 |
| 1,978,838 | 10/1934 | Gavlak | 15/3.12 |
| 3,412,414 | 11/1968 | Perkins | 15/21.1 |
| 3,654,655 | 4/1972 | Mitnick | 15/3.19 |
| 4,881,287 | 11/1989 | Knez | 15/3.13 |

FOREIGN PATENT DOCUMENTS

| | | | |
|---|---|---|---|
| 466659 | 11/1951 | Italy | 15/3.16 |

Primary Examiner—David Scherbel
Assistant Examiner—Tony G. Soohoo
Attorney, Agent, or Firm—Anthony J. Casella; Gerald E. Hespos

[57] ABSTRACT

Processing machinery for cleaning, scrubbing, drying, and polishing produce, such as fruits and vegetables, utilizing centrifugal force produced by the relative rotation between a produce receiving rotating disc member and an opposed stationary disc member, both of which have surfaces in the form of brushes cooperating to treat produce that passes between the two brush surfaces to the disc members' periphery. Produce is introduced by a chute communicating with an inner diameter opening in the stationary disc member and falls onto the center of the rotating disc member where the rotating motion creates a centrifugal force urging it outwardly toward the disc members' periphery between the upper and lower brushes. When the produce reaches the disc periphery it drops off and is directed to a common discharge so that the brushes produce a 360 degree discharge of produce to a single discharge path out of the machine. The basic machine arrangement can also be used for drying and polishing produce.

7 Claims, 2 Drawing Sheets

CENTRIFUGAL PACKINGLINE MACHINE

BACKGROUND OF THE INVENTION

1. Field of the Invention

The present invention relates to a produce handling process and machinery and particularly to an improved process and machinery for cleaning, scrubbing, drying and polishing fresh fruit and vegetables.

2. Description of the Prior Art

Machinery and processes currently used for cleaning and handling fruit and vegetables have not changed significantly in many years. An informative description of the art is found in "Packingline Machinery for Florida Citrus Pakinghouses", by W. F. WARDOWSKI ET AL, published by the Cooperative Extension Service, Univ. of Florida, Institute of Food and Agricultural Sciences, 1987. For the cleaning process, essentially, a line conveyor device is provided with a series of parallel rotating brushes which engage and clean the wetted surfaces of produce passing over them. A typical machine for this purpose has two parallel side rails, spaced anywhere from 24 to 96 inches apart, defining the path of the advancing produce. The length of the side rails depends on how many cleaning brushes are to be used to span the rails. Along each side rail there are pillar block bearings mounted on 5 inch centers. The brushes are each rotatably mounted between two bearings, with one end on one side rail and the other on the opposite side rail. Typically there are anywhere from 4 to 48 washer brushes per machine. These rotary brushes either have shafts extending from the brush core or drive pins which are inserted into the brush core. Sprockets are mounted to the shafts or pins of the brushes and a chain fits around all of the sprockets on one end of the brushes through which they are driven. On a shaft type machine, two bearings and a sprocket are required for each brush so that a 36 brush machine has 72 bearings, 36 sprockets and a large amount of chain. On a drive pin type machine, each brush has two bearings, one sprocket, one drive pin and one idle pin. Such a 36 brush machine requires 36 drive pins, 36 idle pins, 36 sprockets, 72 bearings, a large chain and a lot of chain guards. In some applications the brush drives are staggered from one end to the other to make every other brush rotate in opposite directions. These types of machines have one motor and a gear box to power the brushes and one motor and a gear box to power the clean out part of the machine. The clean out part has a large number of moving parts, chains and sprockets and on most machines the wash water and debris just drop to the floor beneath the machine where some makeshift arrangement is used to restrain their dissemination.

Problem to be Solved:

Since these machines lack self clean-out capability, the chances of damaging the produce due to over cleaning, scrubbing, or polishing is increased. The large number of moving parts cause much noise and usually have to be replaced periodically. Accordingly, the maintenance requirements on these machines are high.

Additionally, in operation, the produce is put in at one end on top of the brushes and is pushed by the following produce along the line to the next set of brushes. In this type of machine the produce usually finds its own axis and is cleaned, scrubbed and polished about a small central portion or zone while passing along the machine, resulting in uneven processing.

Objects:

It is therefore an object of the present invention to provide a method and means for processing produce that offers low maintenance and more complete cleaning, scrubbing, drying and polishing.

It is another object of the invention to provide a method and means utilizing centrifugal force for efficiently processing produce to achieve 360 degree treatment of the produce surfaces and a 360 degree discharge of produce to a single discharge path.

It is a further object of the invention to provide a means for processing produce that is adaptable to different forms for efficiently performing the various functions of cleaning, scrubbing, drying and polishing.

SUMMARY OF THE INVENTION

The present invention is directed to providing a processing method and machinery for cleaning, scrubbing, drying and polishing produce, such as fruits and vegetables, that utilize centrifugal force in handling the produce and minimize moving parts and maintenance requirements while achieving 360 degree treatment of the produce surfaces. The improved machine is constructed of a single vertical shaft supported at each end by a bearing and with a generally disc-shaped member mounted thereon for rotation therewith. The upper surface of the disc member is bristled, i.e., in the form of a brush with fiber ends pointing upwardly. Another disc member is fixedly disposed above the rotating disc member with a bristled or brush surface having the fiber ends pointing downwardly. This upper, stationary disc member is supported by screw jacks mounted on a main frame to allow for height adjustment with respect to the rotating disc member, thus rendering the system capable of controlling cooperation between the two brush surfaces. The disc members' diameters, and the fibers' lengths, diameters, and types may be selected in accordance with the desired application. Typically for cleaning the diameters of the upper and lower disc members may be about 6 feet outer diameter ("OD") with the upper having an inner diameter ("ID") of about 2 feet forming an opening for receiving produce. The upper fibers may be about 6 inches long while the lower fibers may be about 1½ inches with a separation of about ¼ inch between their tips for cleaning application. The height adjustment of the upper member permits adapting the machine operation to selected values of scrubbing action, produce size, rotating of produce, and speed of discharge, as well as to the drying and polishing applications.

The produce may be introduced into the machine by means of a chute communicating with the inner diameter opening in the upper disc member and thus fall onto the middle of the lower rotating disc member. The rotating motion of the lower disc member creates a centrifugal force which forces the produce outwardly toward the disc members' periphery between the upper and lower brushes. The amount of force can be regulated by controlling the speed of rotation of the lower disc member. As the centrifugal force urges the produce toward the disc members' periphery, the resistance from the stationary upper brush and rotation of the lower brush causes the produce to rotate and spin. The spinning action results in scrubbing and cleaning of the produce top and bottom at the same time by the cooperating brushes while moving through water and soap spray to the outside of the disc members. When the produce reaches the disc members' periphery it is discharged and directed along a guide to a common discharge opening so that the brushes achieve a 360 degree discharge of produce to a single discharge path. Specifically, upon discharge from between the two brushes, the produce may take a slight drop onto a rotating pan attached to the lower disc member base, which pan transports it to the common discharge opening. A straight sided water and debris recovery member may surround the periphery of the rotating pan, spaced about ¼ inch therefrom and extending from about 10 inches above it to about 2 inches below, at which point a cone shaped portion is disposed to funnel the water and debris down to a round flat bottom with a drain adequate to accommodate the flow. The discharged water may be filtered and returned to the system for re-use. The upright side member guards the moving parts and collects all the water and debris coming off the disc members.

This machine arrangement can also be used for produce drying by adapting the upper disc member to incorporate openings for passing drying air from air chambers on its back and replacing the type of brushes on both disc members while providing a perforated base on the lower disc member. Air may be forced from the air chamber through the brushes and returned through the cone shaped member to the chamber resulting in a closed loop recycling drying system. Adapting the machine for polishing may be accomplished by replacing the cleaning brushes with polishing brushes and introducing the polish in the manner of the cleaning soap and water and the drying air.

DETAILED DESCRIPTION OF THE PREFERRED EMBODIMENTS

Figure 1:
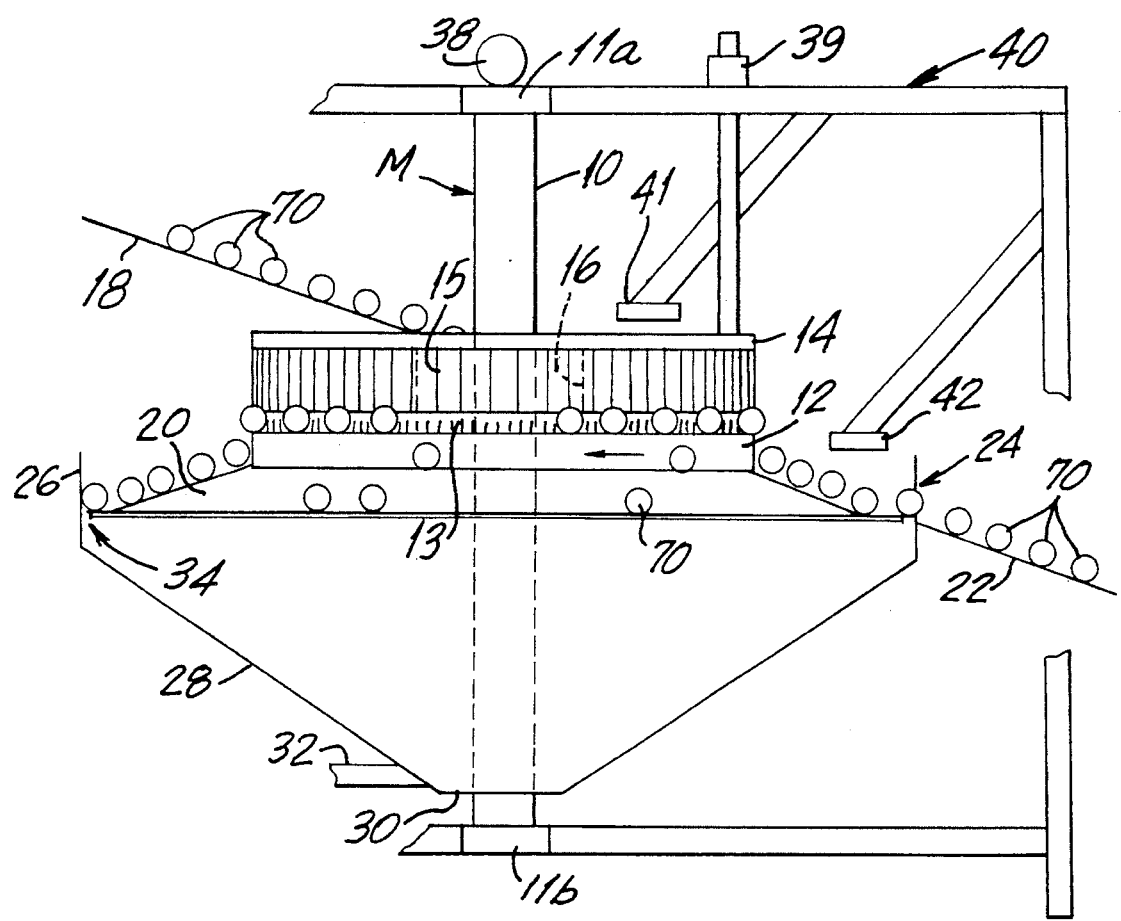
FIG. 1 is a diagrammatic view of a produce cleaning machine in accordance with the present invention.

The present invention involves a method and machinery for cleaning, scrubbing, drying and polishing produce, such as fresh fruits and vegetables, that minimizes the number of moving parts and the amount of maintenance requirements for such machinery and achieves 360 degree treatment of the produce surfaces by using centrifugal force to move the produce through the processing brushes. As seen in FIG. 1, a preferred embodiment of an improved processing machine M is constructed of a single vertical shaft 10, rotatably supported at each end by bearings 11a and 11b, and having a generally disc-shaped member 12 mounted thereon for rotation therewith. The entire upper surface of the disc member 12 may be bristled, i.e., in the form of a brush 13 with fiber ends pointing upwardly. Another generally disc-shaped member 14 is fixedly disposed above the rotating disc member 12 and has a brush surface 15 with the fiber ends pointing downwardly. The stationary disc member 14 is supported, for example, by a number of screw jacks 39 (one shown) mounted on a main frame 40, to allow for its height adjustment with respect to the rotating disc member 12. This adjustability renders the system capable of controlling cooperation between the two brush surfaces. The disc members' diameters, and the fibers' lengths, diameters, and types may be selected in accordance with the desired application. Typically the diameters of the upper and lower disc members for the cleaning and scrubbing application may be about 6 feet OD, with the upper member having an ID of about 2 feet to allow for an opening 16 between it and the shaft 10. The upper bristles or fibers 15 may be about 6 inches long, while the lower fibers 13 may be about 1½ inches with a separation of approximately ¼ inch between their tips. The height adjustment capability of the upper member permits adapting the machine operation to selected values of scrubbing action, produce size, rotating of produce, and speed of discharge.

The produce 70, for example, oranges, may be introduced into the machine M by means of a chute 18 communicating with the inner diameter opening 16 in the upper disc member 14 and thus falls onto the middle of the lower rotating disc member 12. The rotating motion of the lower disc member 12, creates a centrifugal force which forces the produce 70 outwardly toward the disc members' periphery between the bristles of the upper and lower brushes 15 and 13. The amount of force can be regulated by controlling the speed of rotation of the lower disc member 12 through shaft 10 and drive source 38 which may comprise a single motor and gear box. This speed may also be regulated to control and optimize produce throughout. As the centrifugal force urges the produce toward the disc members' periphery, the resistance from the stationary upper brush 15 and rotation of the lower brush 13 causes the produce to rotate and spin. The spinning action results in scrubbing and cleaning of the produce top and bottom at the same time by the cooperating brushes while the pieces 70 move through water and soap spray, provided between the brushes, to the outside rim of the disc members. When the produce 70 reaches the disc members' periphery it is discharged from between the two brushes and takes a slight drop onto a rotating pan 20 which directs the produce around its periphery to a common discharge opening 24 onto a chute 22. The truncated-cone-shaped pan 20 is attached to the lower disc member's base for rotation therewith and transports the processed produce to the common discharge opening 24 which is formed in a straight sided water and debris recovery member 26. The discharge action of the brushes and rotating action of the pan 20 cooperate with the side of member 26 to guide the produce 70, undergoing a 360 degree discharge from the brushes, to a single discharge path (22). The recovery member 26 may surround the periphery of the rotating pan 20, with its side spaced, e.g., about ¼ inch therefrom and extending from about 10 inches above it to about 2 inches below, at which point a cone-shaped portion 28 is disposed to funnel the water and debris down to a round flat bottom 30 with a drain 32 adequate to accommodate the flow. The discharged water, passing through the ¼ inch opening 34 between the pan 20 and the side, may be filtered and returned to the system for re-use. The upright sides guard the moving parts and also collect all the water and debris coming off the disc members 12 and 14.

In order to supply the water and soap, an array of radially extending nozzles 41 (one shown) may be disposed above the upper disc member 14, preferably at the ends of ten radially extending spokes at 36 degree intervals. Each spoke may include a set of three nozzles from which water and soap is dispensed through the upper brush 15 onto the produce 70 as it spins and rotates outwardly through the brushes. As the produce drops from the periphery of the lower disc member 12, an additional array of spray nozzles 42 (one shown) is provided with clear water for cleaning the soap off the produce's surface.

The bristles of the upper cleaning brushes 15 are preferably X-shaped in cross-section and of synthetic plastic material, referred to as PEX. Their length is preferably about 6 inches, as noted above, and their cross-section about 0.040 inches. The lower brush 13 bristles may also be of synthetic plastic with a length of about 1¼ inches and a cross-section of about 0.022 inches. For produce such as smaller fruit, e.g., oranges, with a diameter of about 3 to 4 inches, the separation between the brushes' fiber tips may be approximately ¼ inch. With larger fruit, e.g., grapefruit, having a 6 inch diameter, the separation may be enlarged to approximately 1¼ inches. Appropriate selections of bristles and dimensions may be made based on the produce to be processed, such as for tomatoes or cucumbers as well as citrus fruit.

Figure 2:
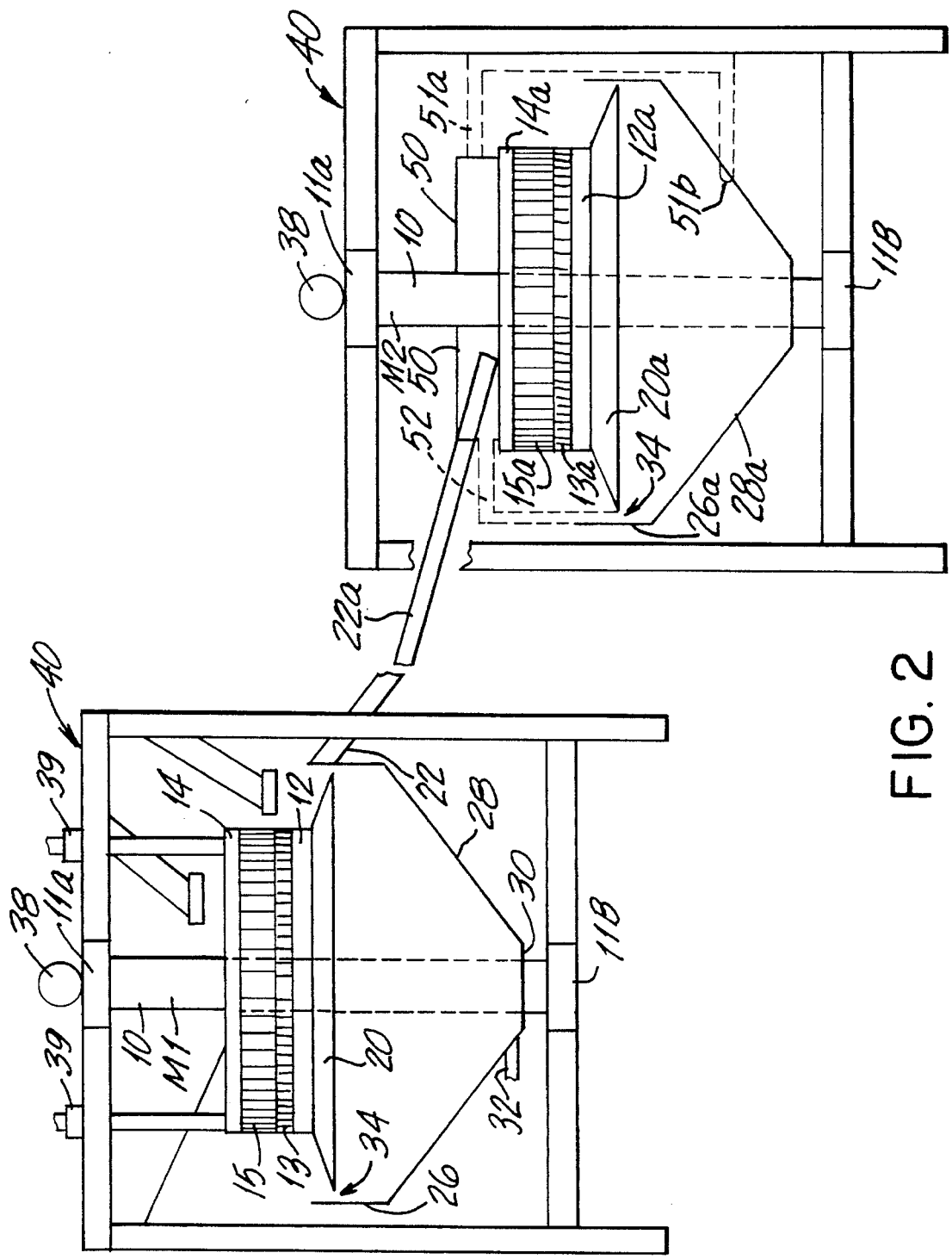
FIG. 2 is a diagrammatic view illustrating a combination of a cleaning machine and drying machine arranged on a produce packingline in accordance with the invention.

The scrubbing machine arrangement of FIG. 1 can also be adapted for use in drying produce by modifying the brushes and members as shown at the right in FIG. 2. The cleaned and scrubbed produce discharged from cleaning machine M1 may be fed from discharge chute 22 onto chute 22a for feeding to a second machine M2 configured as a dryer. The adapted disc member 14a in the dryer is modified by incorporating top openings for passing drying air from air chambers 50 on its back. The cleaning brushes 15 and 13 are replaced with different types of brushes 15a and 13a on both disc members, more suitable for drying, while the adapted lower disc member 12a is provided with a perforated base for passing air. Air may be forced from the air chambers 50 down through the brushes 15a and 13a, over the produce passing therebetween, and then through the perforations in lower disk member 12a and returned through the cone portion 28a to the chambers 50 resulting in a closed loop recycling drying system. The return system may be formed by ducting 51a cooperating with holes 51b in the cone portion 28a and/or by ducting 52 cooperating with the opening 34 between the wall 26a and the edge of conical portion 20a. Thus, the basic machine arrangement is capable of being adapted for both cleaning and drying of the produce being processed.

The basic machine arrangement may also be readily adapted for polishing the produce by replacing the cleaning brushes 13 and 15 or drying brushes 13a and 15a with suitable polishing brushes, and polishing spray may be introduced by means akin to the washing nozzles or drying air ducts.

Accordingly, appropriate cleaning, drying and polishing machines may be used in tandem as shown in FIG. 2, or in certain cases a single machine might be used, combining the various treating systems therein, or being capable of successive refittings for each stage of produce processing.

It will be seen that the invention provides a low maintenance machine which may use a simple drive system involving only a single motor and gear box with only two bearings and one moving shaft. Noise levels are reduced making the usual indoor operation of the machine less annoying and distracting to employees thus increasing safety and workplace acceptability. As water and debris are gathered at a single place, the arrangement makes for a cleaner workplace and enhances disposal of unwanted materials and permits the recycling of the water if desired. The application of centrifugal force causes the produce to rotate and spin as it is forced to the outside so that it does not seek its own axis and thus undergoes 360 degree cleaning, scrubbing, drying and polishing. Consequently, the produce is processed over its entire surface, top, bottom and sides, at the same time resulting in more thorough cleaning, drying and polishing. Further, the invention has the advantage of self clean out to prevent the chance of produce damage due to over cleaning, scrubbing, etc. Additionally, control of the centrifugal force, through regulating rotational speed, permits the optimizing of produce throughout.

While the invention has been described with respect to preferred embodiments, it is apparent that various changes may be made without departing from the spirit and scope of the invention as defined by the appended claims. For example, the upper brush may be rotated relative to the lower brush. Alternatively, both brushes may be rotated at different speeds of rotation, or in opposite directions, so as to achieve relative rotation therebetween in order to achieve complete cleaning, drying and polishing of the agricultural product.

What is claimed is:

1. Apparatus for treating produce, such as fruit and vegetables, comprising:

a rotatable shaft;

a first generally disc-shaped member disposed about said shaft and having a first bristled surface and an interior opening for passing produce between said shaft and said first member;

a second generally disc-shaped member, disposed opposite said first member and mounted on said shaft for rotation therewith, and having a second bristled surface cooperating with said first bristled surface for passing produce therebetween;

means for introducing produce into said opening onto said second member and between said first and second bristled surfaces;

means for driving said shaft to rotate said second member to impose a centrifugal force on produce between said first and second bristled surfaces forcing said produce outwardly to the periphery of said first and second members;

means for receiving said produce upon a 360° discharge from the periphery of said first and second members and for guiding said produce to a single discharge path; and means for providing a treating medium through said first bristled surface for treating said produce while passing outwardly to the periphery of said first and second members.

2. Apparatus as in claim 1, further comprising means for adjusting the position of said first member with respect to said second member to control the cooperation between said first and second bristled surfaces.

3. Apparatus as in claim 1, wherein said treating medium is a material selected from the group consisting of water, soap, air and polish.

4. Apparatus as in claim 1, further comprising means, disposed beneath said receiving means, for collecting said treating medium after application to said produce.

5. Apparatus as in claim 1, further comprising means for treating said produce on said receiving means.

6. Apparatus as in claim 5, wherein said treating means comprises means for drying said produce.

7. Apparatus as in claim 5, wherein said treating means comprises means for polishing said produce.

\* \* \* \* \*